United States Patent
Muccini et al.

(10) Patent No.: US 9,658,668 B2
(45) Date of Patent: May 23, 2017

(54) SYSTEMS AND METHODS FOR PROGRAMMABLE SYSTEM RIDE-THROUGH AND HOLD-UP

(71) Applicant: Dell Products L.P., Round Rock, TX (US)

(72) Inventors: Mark A. Muccini, Georgetown, TX (US); Lei Wang, Austin, TX (US); John Erven Jenne, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 14/814,199

(22) Filed: Jul. 30, 2015

(65) Prior Publication Data

US 2017/0031402 A1    Feb. 2, 2017

(51) Int. Cl.
| | |
|---|---|
| *G06F 1/26* | (2006.01) |
| *G06F 1/00* | (2006.01) |
| *H02J 9/00* | (2006.01) |
| *G06F 1/32* | (2006.01) |
| *G06Q 50/06* | (2012.01) |

(52) U.S. Cl.
CPC .............. *G06F 1/263* (2013.01); *G06F 1/329* (2013.01); *G06F 1/3287* (2013.01); *G06Q 50/06* (2013.01)

(58) Field of Classification Search
CPC ..................................................... G06F 1/3203
USPC ......................................................... 713/320
See application file for complete search history.

(56) References Cited

U.S. PATENT DOCUMENTS

| | | | | |
|---|---|---|---|---|
| 5,142,165 A | * | 8/1992 | Allard ...................... | G06F 1/24 307/130 |
| 5,315,161 A | * | 5/1994 | Robinson ................. | G06F 1/30 307/66 |
| 6,195,754 B1 | * | 2/2001 | Jardine ..................... | G06F 1/30 713/324 |
| 9,024,609 B2 | * | 5/2015 | Milavec ................... | H02J 1/10 323/224 |
| 2015/0171664 A1 | * | 6/2015 | Liu .......................... | H02J 9/061 307/64 |

* cited by examiner

*Primary Examiner* — Suresh Suryawanshi
(74) *Attorney, Agent, or Firm* — Jackson Walker L.L.P.

(57) ABSTRACT

An information handling system may include a power management system comprising a power supply unit having an input for receiving an alternating current input waveform from a bulk capacitor for storing charge. The power management system may be configured to calculate an energy budget associated with an amount of energy stored in the bulk capacitor that may be used to power at least one information handling resource in response to a loss of the alternating current input waveform. The power management system may further be configured to determine a portion of the energy budget required to satisfy a requirement, the requirement comprising one of a hold-up time requirement and a ride-through requirement of the information handling system. The power management system may further be configured to allocate the energy budget between hold-up and ride-through of the information handling system in a manner that satisfies the requirement.

16 Claims, 3 Drawing Sheets

SYSTEMS AND METHODS FOR PROGRAMMABLE SYSTEM RIDE-THROUGH AND HOLD-UP

TECHNICAL FIELD

The present disclosure relates in general to information handling systems, and more particularly to systems and methods for providing programmability for ride-through and hold-up periods in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include one or more power supply units for providing electrical energy to components of the information handling system. Typically, a power supply unit is configured to operate from an input alternating current (AC) source of electrical energy, which the power supply unit converts to a direct current (DC) output. Thus, typically a power supply unit may include a rectifier and/or power factor correction stage to receive the input AC source and rectify the input AC waveform to charge a bulk capacitor to a desired voltage. A direct-current-to-direct-current (DC-DC) stage may convert the voltage on the bulk capacitor to a DC output voltage which may be used to power components of the information handling system.

In traditional approaches, a power supply unit may be capable of, immediately after removal of the AC source to the power supply unit, providing electrical energy at its output for a period of time using the stored charge on the bulk capacitor to provide an output direct-current voltage. Such a period of time is limited, of course, as once the alternating current input is not available, the bulk capacitor will discharge and the power supply unit will shutdown.

As illustrated in FIG. 1, one portion of this period of time is known as a ride-through time $T_{rt}$ and represents a period of time for which the power supply unit continues to generate a direct current output while waiting for reapplication of the AC source. If the AC source is not reapplied within the ride-through time, the available stored energy on the bulk capacitor may fall below a threshold, and the power supply unit may de-assert a signal (e.g., BULK_OK). The de-assertion of the BULK_OK signal signifies entry into a period known as the hold-up time $T_{up}$ in which the information handling system may use additional energy remaining stored within the bulk capacitor to power components such that components may complete tasks before the power supply unit is no longer able to provide an adequate direct current output voltage (as indicated by signal DC_OK in FIG. 1 de-asserting). For example, in response to an impending shutdown resulting from loss of alternating current input to a power supply unit, a write-back cache may flush data to a non-volatile memory, and the hold-up time may provide sufficient time for the write-back cache to use available electrical energy from the power supply unit in order to complete the cache flush before the power supply unit ceases generating an output voltage as a result of the withdrawal of the input alternating-current waveform. After the hold-up time has expired, the power supply unit may terminate its DC output in an orderly shutdown procedure.

SUMMARY

In accordance with the teachings of the present disclosure, the disadvantages and problems associated with existing approaches to providing adequate ride-through time and hold-up time in an information handling system may be reduced or eliminated.

In accordance with embodiments of the present disclosure, an information handling system may include at least one information handling resource and a power management system comprising a power supply unit having an input for receiving an alternating current input waveform from a bulk capacitor for storing charge. The power management system may be configured to calculate an energy budget associated with an amount of energy stored in the bulk capacitor that may be used to power the at least one information handling resource in response to a loss of the alternating current input waveform. The power management system may further be configured to determine a portion of the energy budget required to satisfy a requirement, the requirement comprising one of a hold-up time requirement and a ride-through requirement of the information handling system. The power management system may further be configured to allocate the energy budget between hold-up and ride-through of the information handling system in a manner that satisfies the requirement.

In accordance with these and other embodiments of the present disclosure, a method may include calculating an energy budget associated with an amount of energy stored in a bulk capacitor of a power supply unit that may be used to power at least one information handling resource in response to a loss of an alternating current input waveform to the power supply unit. The method may also include determining a portion of the energy budget required to satisfy a requirement, the requirement comprising one of a hold-up time requirement and a ride-through requirement of an information handling system comprising the at least one information handling resource. The method may further include allocating the energy budget between hold-up and ride-through of the information handling system in a manner that satisfies the requirement.

In accordance with these and other embodiments of the present disclosure, an article of manufacture may include a non-transitory computer-readable medium and computer-executable instructions carried on the computer-readable medium, the instructions readable by a processor, the instructions, when read and executed, for causing the processor to: (i) calculate an energy budget associated with an amount of energy stored in a bulk capacitor of a power supply unit that may be used to power at least one information handling resource in response to a loss of an alternating current input waveform to the power supply unit; (ii) determine a portion of the energy budget required to satisfy a requirement, the requirement comprising one of a hold-up time requirement and a ride-through requirement of an information handling system comprising the at least one information handling resource; and (iii) allocate the energy budget between hold-up and ride-through of the information handling system in a manner that satisfies the requirement.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 2-5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 2:
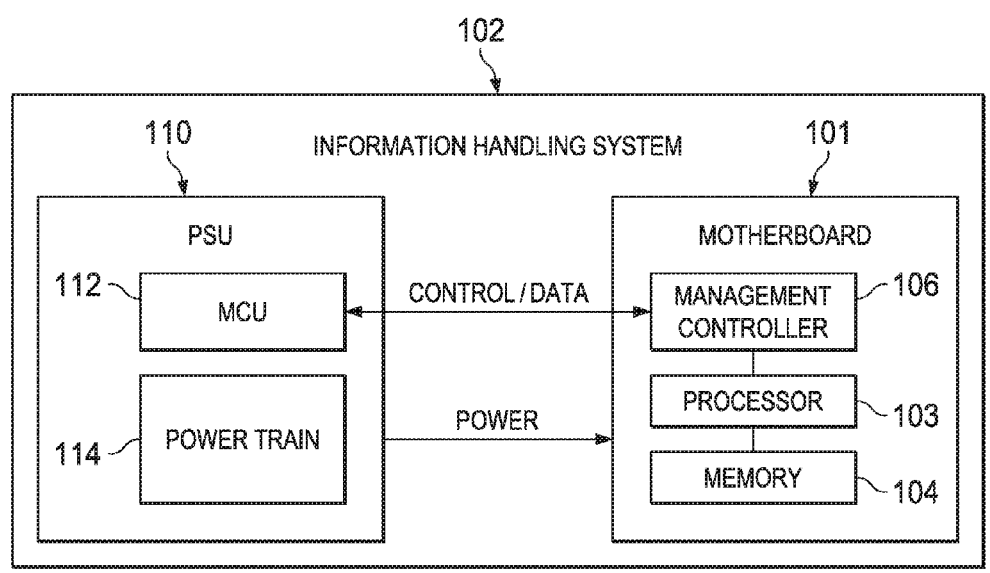
FIG. 2 illustrates a block diagram of an example information handling system, in accordance with embodiments of the present disclosure.

FIG. 2 illustrates a block diagram of an example of an information handling system 102. As depicted, information handling system 102 may include a power supply unit (PSU) 110, a motherboard 101, and one or more other information handling resources.

Figure 1:
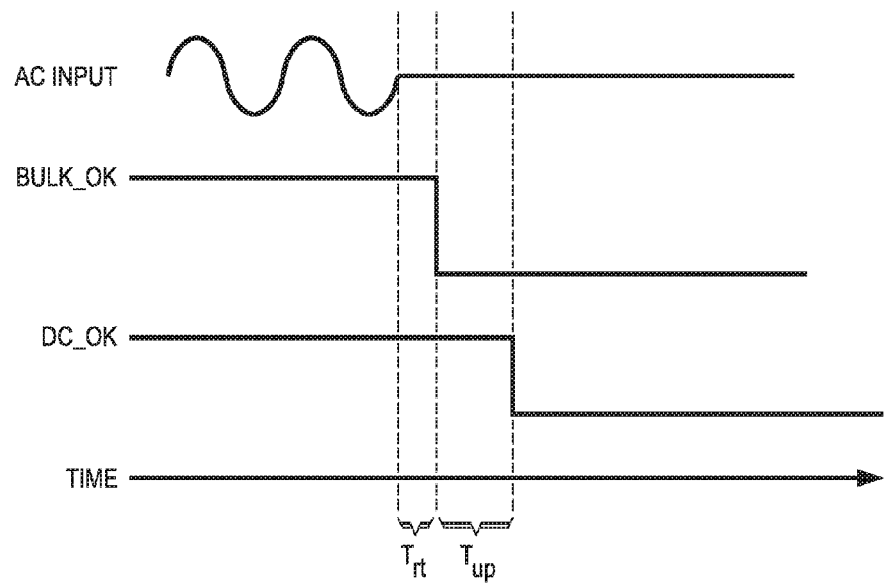
FIG. 1 illustrates a timing diagram depicting the occurrence of ride-through time and hold-up time in an information handling system, as is known in the art.

Motherboard 101 may include a circuit board configured to provide structural support for one or more information handling resources of information handling system 102 and/or electrically couple one or more of such information handling resources to each other and/or to other electric or electronic components external to information handling system 102. As shown in FIG. 1, motherboard 101 may include a processor 103, memory 104, a management controller 106, and one or more other information handling resources.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. In particular embodiments, memory 104 may comprise a non-volatile memory comprising one or more NVDIMMs. Management controller 106 may be configured to provide out-of-band management facilities for management of information handling system 102. Such management may be made by management controller 106 even if information handling system 102 is powered off or powered to a standby state. Management controller 106 may include a processor, memory, an out-of-band network interface separate from and physically isolated from an in-band network interface of information handling system 102, and/or other embedded information handling resources. In certain embodiments, management controller 106 may include or may be an integral part of a baseboard management controller (BMC) or a remote access controller (e.g., a Dell Remote Access Controller or Integrated Dell Remote Access Controller). In other embodiments, management controller 106 may include or may be an integral part of a chassis management controller (CMC). In some embodiments, management controller 106 may be configured to communicate with a PSU 110 to communicate control and/or telemetry data between management controller 106 and PSU 110. For example, PSUs 110 may communicate information regarding status and/or health of PSUs 110 and/or measurements of electrical parameters (e.g., electrical currents or voltages) present within PSU 110. As a specific example, control signals such as those depicted in FIG. 1 (e.g., BULK_OK, DC_OK) may be communicated between management controller 106 and/or MCU 112 in order to establish, control, and/or apply programmable ride-through time and hold-up time, as described in greater detail elsewhere.

Generally speaking, PSU 110 may include any system, device, or apparatus configured to supply electrical current to one or more information handling resources of information handling system 102. As shown in FIG. 2, PSU 110 may include a microcontroller unit (MCU) 112 and a power train 114. Power train 114 of PSU 110 may be coupled at its outputs to a power bus configured to deliver electrical energy to motherboard 101 and other components of information handling system 102.

MCU 112 may comprise a microprocessor, DSP, ASIC, FPGA, EEPROM, or any combination thereof, or any other device, system, or apparatus for controlling operation of PSU 110. As such, MCU 112 may comprise firmware, logic, and/or data for controlling functionality of PSU 110. As shown in FIG. 2, an MCU 112 may be communicatively coupled to management controller 106 allowing for communication of data and/or control signals between management controller 106 and MCU 112.

Power train 114 may include any suitable system, device, or apparatus for converting electrical energy received by PSU 110 (e.g., a 120-volt alternating current voltage waveform) into electrical energy usable to information handling resources of information handling system 102 (e.g., 12-volt direct current voltage source). In some embodiments, power train 114 may comprise a rectifier. In these and other embodiments, power train 114 may comprise a voltage regulator (e.g., a multi-phase voltage regulator). An example implementation of power train 114 is set forth in FIG. 3 below.

In addition to motherboard 101, processor 103, memory 104, management controller 106, and PSU 110, information handling system 102 may include one or more other information handling resources. For example, in some embodiments, information handling system 102 may include more than one PSU 110.

Figure 3:
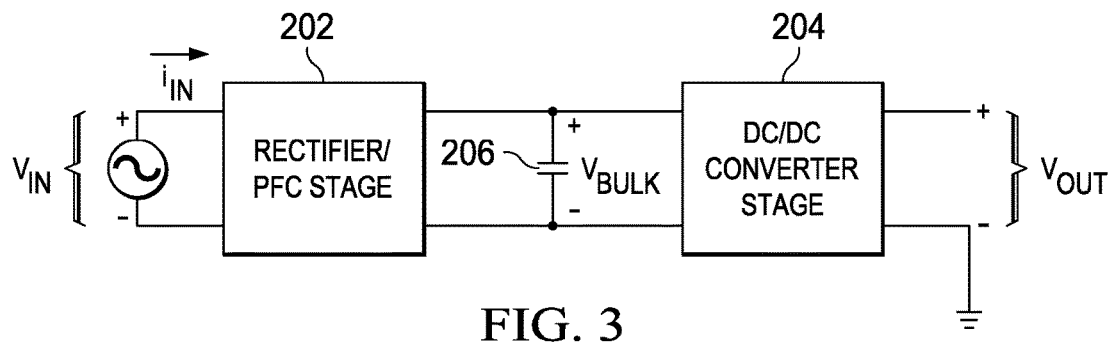
FIG. 3 illustrates an example power train of a power supply unit, in accordance with embodiments of the present disclosure.

FIG. 3 illustrates a block diagram of an example power train 114, in accordance with embodiments of the present disclosure. As shown in FIG. 3, power train 114 may include multiple converter stages: a rectifier/power factor correcting (PFC) stage 202, a DC/DC converter stage 204, and a bulk capacitor 206 coupled between an output of rectifier/PFC stage 202 and an input of DC/DC converter stage 204.

Rectifier/PFC stage 202 may be configured to, based on an input current $i_{IN}$, a sinusoidal voltage source $v_{IN}$, and a bulk capacitor voltage $V_{BULK}$, shape the input current $i_{IN}$ to have a sinusoidal waveform in-phase with the source voltage $v_{IN}$ and to generate regulated DC bus voltage $V_{BULK}$ on bulk capacitor 206. In some embodiments, rectifier/PFC stage 202 may be implemented as an AC/DC converter using a boost converter topology.

DC/DC converter stage 204 may convert bulk capacitor voltage $V_{BULK}$ to a DC output voltage $V_{OUT}$ which may be provided to a load (e.g., to motherboard 101 and/or other information handling resources of information handling system 102 in order to power such information handling resources). In some embodiments, DC/DC converter stage 204 may be implemented as a resonant converter which converts a higher DC voltage (e.g., 400 V) into a lower DC voltage (e.g., 12 V).

In operation, management controller 106 may be configured to calculate an energy budget for ride-through and hold-up, determine a portion of the energy budget required for either of ride-through or hold-up, and then allocate the energy budget to ride-through and hold-up, as described in greater detail below.

Figure 4:
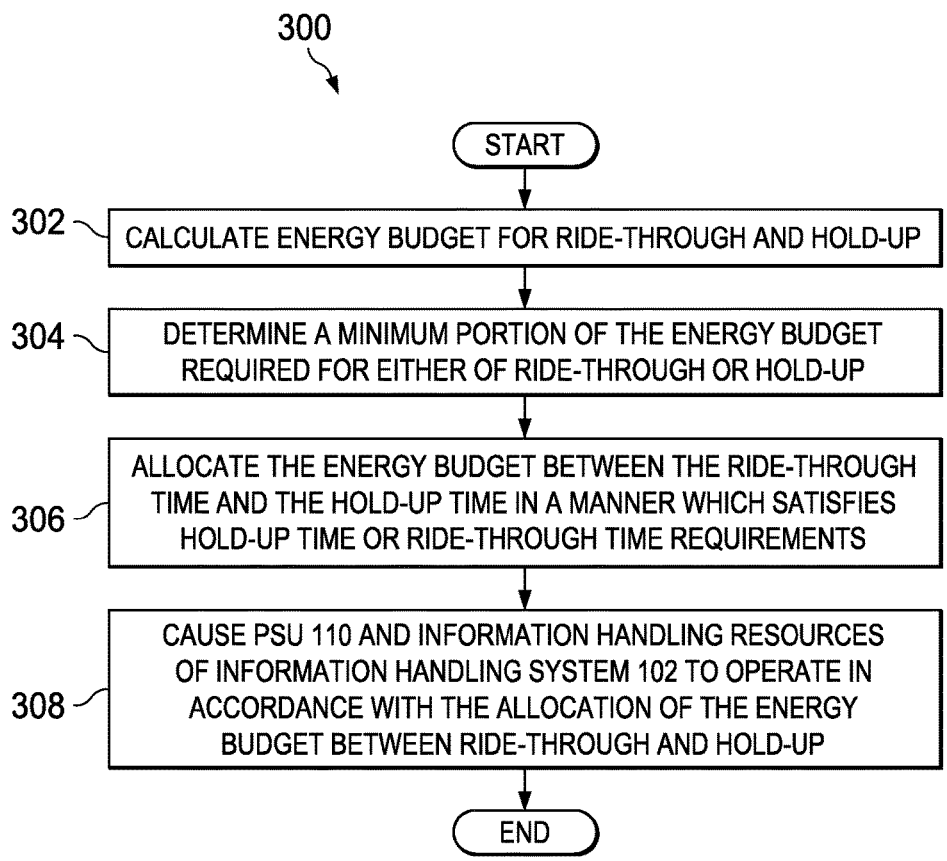
FIG. 4 illustrates a flow chart of an example method for setting a programmable system ride-through time and hold-up time, in accordance with embodiments of the present disclosure.

FIG. 4 illustrates a flow chart of an example method 300 for setting a programmable system ride-through time and hold-up time, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

Figure 5:
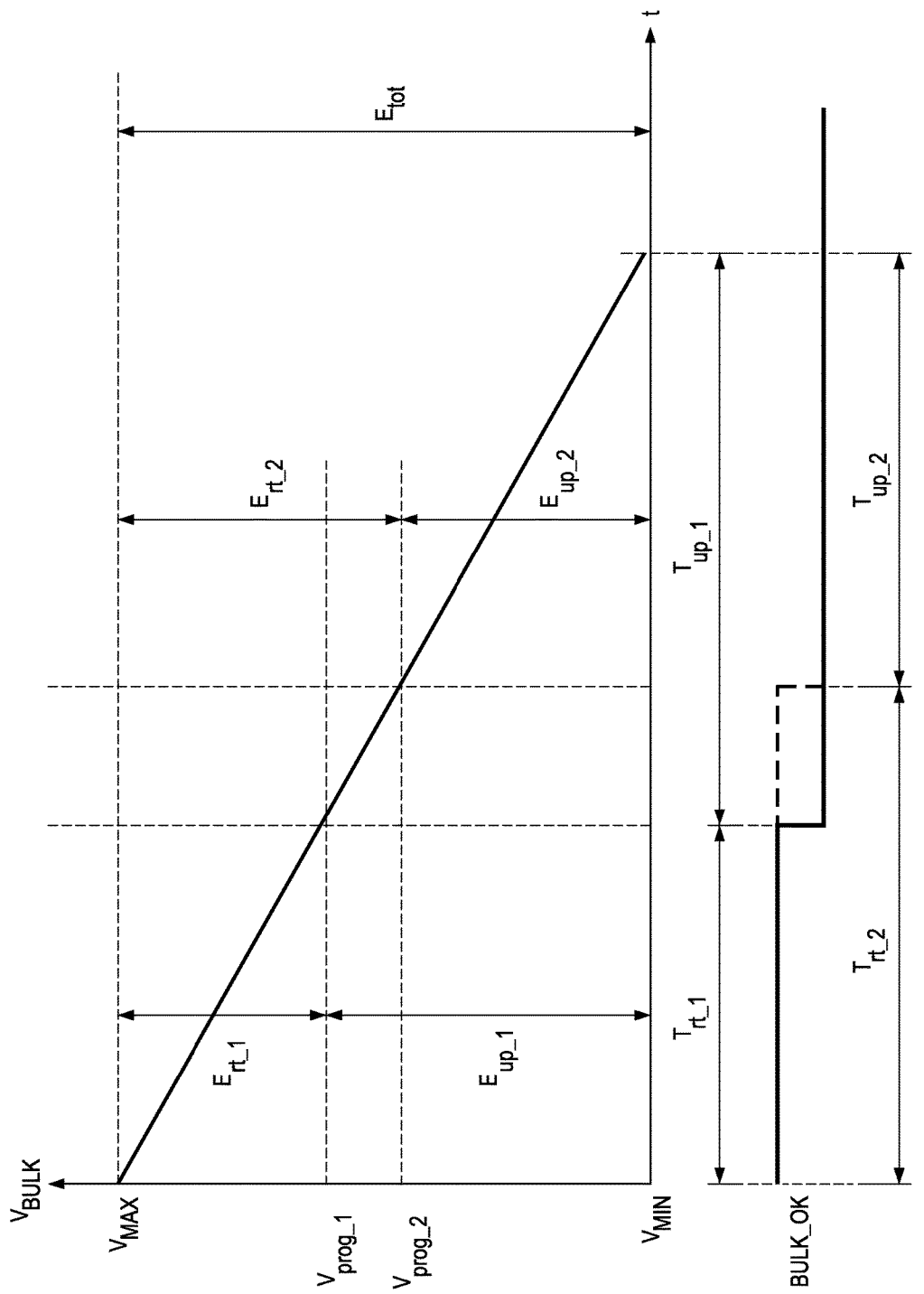
FIG. 5 illustrates a timing diagram depicting voltage decay of a bulk capacitor and associated energy envelopes defining programmable ride-through and hold-up times, in accordance with embodiments of the present disclosure.

At step 302, a power management subsystem comprising one or both of management controller 106 and PSU 110 may calculate or otherwise determine an energy budget for ride-through and hold-up. For example, energy available for ride-through and hold-up may be given by the equation:

$$E_{tot} = \frac{C(v_{max}^2 - v_{min}^2)}{2}$$

where E is the energy available for ride-through and hold-up, C is a capacitance of bulk capacitor 206, $V_{max}$ is a voltage maintained on bulk capacitor 206 when an alternating current input source is present, and $V_{min}$ is a minimum voltage required to maintain a usable DC voltage at the output of power train 114. A representation of these values is shown in FIG. 5, which illustrates a timing diagram depicting voltage decay of bulk capacitor 206 and associated energy envelopes defining programmable ride-through and hold-up times, in accordance with embodiments of the present disclosure.

At step 304, the power management subsystem may determine a minimum portion of the energy budget required for either of ride-through or hold-up. For example, the power management subsystem may, based on an inventory of information handling resources present in information handling system 102, determine an amount of energy required to satisfy the hold-up time requirements of such information handling resources and communicate a message or other indication to PSU 110 indicative of such amount of energy. Such minimum amount of energy may be determined based on the number and types of information handling resources, their power requirements, and/or hold-up time requirements as set forth by providers (e.g., vendors, manufacturers) of the information handling resources or as set according to user preference (e.g., by a user interfacing with management controller 106). As another example, the power management subsystem may, based on a user-configurable setting defining a desired ride-through time and an inventory of information handling resources present in information handling system 102, determine an amount of energy required to satisfy such ride-through requirement.

At step 306, based on the determination made in step 304, the power management subsystem may allocate the energy budget between the ride-through time $T_{rt}$ and the hold-up time $T_{up}$ in a manner which satisfies the hold-up time or ride-through time requirements determined in step 304. For example, if the power management subsystem determines a portion of energy required to satisfy hold-up requirements, it may allocate such portion of energy (or more, to provide some energy margin) from the energy budget to the hold-up time and the remaining energy budget to the ride-through time. On the other hand, if the power management subsystem determines a portion of energy required to satisfy ride-through requirements, it may allocate such portion of energy (or more, to provide some energy margin) from the energy budget to the ride-through time and the remaining energy budget to the hold-up time.

A time value of ride-through time $T_{rt}$ may be derived from a programmable bulk energy range referred to as ride-through energy $E_{rt}$, a DC-DC efficiency $\text{Eff}_{DC-DC}$ of DC-to-DC converter 204, and average output power $P_{out\_rt}$ delivered by PSU 110 during the ride-through time $T_{rt}$ in accordance with the equation:

$$T_{rt} = \frac{E_{rt}}{P_{out\_rt}/\text{Eff}_{DC-DC}}$$

Similarly, a time value of hold-up time $T_{up}$ may be derived from a programmable bulk energy range referred to as hold-up energy $E_{up}$, the DC-DC efficiency $\text{Eff}_{DC-DC}$ of DC-to-DC converter 204, and average output power $P_{out\_up}$ delivered by PSU 110 during the hold-up time $T_{up}$ in accordance with the equation:

$$T_{up} = \frac{E_{up}}{P_{out\_up}/\text{Eff}_{DC-DC}}$$

As seen from FIG. 5, the total available energy to maintain the DC output, during an input loss, is the summation of $E_{tot}=E_{rt}+E_{up}$. Because each of ride-through time $T_{rt}$ and hold-up time $T_{up}$ are dependent upon average output power delivered by PSU 110 during such periods, the power management system may manipulate the load of PSU 110 during such periods to manage each time region by modifying system component power consumption. Such power consumption management techniques may include, without limitation, control of processor performance (e.g., frequency), control of a motor speed of an air mover for moving air to cool information handling resources, and selective enabling or disabling of information handling resources.

In addition, in accordance with the present disclosure, the power management system may program the relative amounts of ride-through energy $E_{rt}$ and hold-up energy $E_{up}$ (and thus the relative amounts of ride-through time $T_{rt}$ and hold-up time $T_{up}$) by setting a programmable voltage $V_{prog}$ at which the signal BULK_OK is de-asserted to signal the end of the ride-through time $T_{rt}$ and the beginning of the hold-up time $T_{up}$. With such programmable voltage, ride-through energy $E_{rt}$ may be given by:

$$E_{rt} = \frac{C(v_{max}^2 - v_{prog}^2)}{2}$$

and hold-up energy $E_{up}$ may be given by:

$$E_{tup} = \frac{C(v_{prog}^2 - v_{min}^2)}{2}$$

Turning again to FIG. 4, at step 308, the power management subsystem may cause PSU 110 and information handling resources of information handling system 102 to operate in accordance with the allocation of the energy budget between ride-through and hold-up. After completion of step 308, method 300 may end.

Although FIG. 4 discloses a particular number of steps to be taken with respect to method 300, method 300 may be executed with greater or fewer steps than those depicted in FIG. 4. In addition, although FIG. 4 discloses a certain order of steps to be taken with respect to method 300, the steps comprising method 300 may be completed in any suitable order.

Method 300 may be implemented using system 300 or any other system operable to implement method 300. In certain embodiments, method 300 may be implemented partially or fully in software and/or firmware embodied in computer-readable media.

Among the advantages of the methods and system described herein are that ride-through and hold-up may be flexibly configured based on a system configuration and/or user usage model via programmability of energy available to each of ride-through and hold-up, in addition to manipulating the average output power of PSU 110 during ride-through and hold-up. Referring again to FIG. 5, a first configuration of the power management system may provide for a programmable voltage of $V_{prog\_1}$, resulting in ride-through energy $E_{rt\_1}$, hold-up energy $E_{up\_1}$, ride-through time $T_{rt\_1}$, and hold-up time $T_{up\_1}$. However, a second configuration having a lower programmable voltage of $V_{prog\_2}$, may result in an increased ride-through energy $E_{rt\_2}$, decreased hold-up energy $E_{up\_2}$, increased ride-through time $T_{rt\_2}$, and decreased hold-up time $T_{up\_2}$.

As an example of an application of the programmability functionality described herein, higher programmable ride-through times may allow for systems to be more resilient to input power quality problems. Thus a user of an information handling system may program the ride-through value required for his or her application environment, therefor allowing for the information handling system to be customizable to the user's application environment. One specific example would be to tune the $T_{rt}$ to meet the needs of automatic transfer switch transfer times.

As another example, the systems and methods provided herein may allow for flexibility in tuning hold-up times to satisfy requirements for NVDIMMs, including cache flushing times associated with flushing data to NVDIMMs, or for cache-to-flash operations. During the hold-up time $T_{up}$, a processor cache may be flushed to a volatile memory in preparation for an alternative power source (e.g., a battery) to power the information handling system in a reduced power state in which data may be transferred to flash or other non-volatile memory.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   at least one information handling resource; and
   a power management system comprising a power supply unit having an input for receiving an alternating current input waveform from a bulk capacitor for storing charge, the power management system configured to:
   calculate an energy budget associated with an amount of energy stored in the bulk capacitor that may be used to power the at least one information handling resource in response to a loss of the alternating current input waveform;
   determine a portion of the energy budget required to satisfy a requirement, the requirement comprising one of a hold-up time requirement and a ride-through requirement of the information handling system;
   allocate the energy budget between hold-up and ride-through of the information handling system in a manner that satisfies the requirement; and
   set a programmable voltage based on the allocation of the energy budget, the programmable voltage defining a voltage of the bulk capacitor at which the power management system transitions between hold-up and ride-through of the information handling system.

2. The information handling system of claim 1, wherein the requirement is based on a configuration of the at least one information handling resource.

3. The information handling system of claim 1, wherein the requirement is based on characteristics of the power supply unit.

4. The information handling system of claim 1, wherein the requirement is based on a user-configurable setting.

5. The information handling system of claim 1, wherein the power management subsystem comprises a management controller communicatively coupled to the power supply unit.

6. The information handling system of claim 5, wherein determining the portion of the energy budget required to satisfy the requirement comprises receiving an indication by the power supply unit from the management controller indicative of the portion of the energy budget.

7. A method comprising:
   calculating an energy budget associated with an amount of energy stored in a bulk capacitor of a power supply unit that may be used to power at least one information handling resource in response to a loss of an alternating current input waveform to the power supply unit;
   determining a portion of the energy budget required to satisfy a requirement, the requirement comprising one of a hold-up time requirement and a ride-through requirement of an information handling system comprising the at least one information handling resource;
   allocating the energy budget between hold-up and ride-through of the information handling system in a manner that satisfies the requirement; and
   setting a programmable voltage based on the allocating of the energy budget, the programmable voltage defining a voltage of the bulk capacitor at which a power management system transitions between hold-up and ride-through of the information handling system.

8. The method of claim 7, wherein the requirement is based on a configuration of the at least one information handling resource.

9. The method of claim 7, wherein the requirement is based on characteristics of the power supply unit.

10. The method of claim 7, wherein the requirement is based on a user-configurable setting.

11. The method of claim 7, wherein determining the portion of the energy budget required to satisfy the requirement comprises receiving an indication indicative of the portion of the energy budget.

12. An article of manufacture comprising:
    a non-transitory computer-readable medium; and
    computer-executable instructions carried on the computer-readable medium, the instructions readable by a processor, the instructions, when read and executed, for causing the processor to:
    calculate an energy budget associated with an amount of energy stored in a bulk capacitor of a power supply unit that may be used to power at least one information handling resource in response to a loss of an alternating current input waveform to the power supply unit;
    determine a portion of the energy budget required to satisfy a requirement, the requirement comprising one of a hold-up time requirement and a ride-through requirement of an information handling system comprising the at least one information handling resource;
    allocate the energy budget between hold-up and ride-through of the information handling system in a manner that satisfies the requirement; and
    set a programmable voltage based on the allocation of the energy budget, the programmable voltage defining a voltage of the bulk capacitor at which a power management system transitions between hold-up and ride-through of the information handling system.

13. The article of claim 12, wherein the requirement is based on a configuration of the at least one information handling resource.

14. The article of claim 12, wherein the requirement is based on characteristics of the power supply unit.

15. The article of claim 12, wherein the requirement is based on a user-configurable setting.

16. The article of claim 12, wherein determining the portion of the energy budget required to satisfy the requirement comprises receiving an indication indicative of the portion of the energy budget.

* * * * *